(12) United States Patent
Dale et al.

(10) Patent No.: US 9,484,583 B2
(45) Date of Patent: Nov. 1, 2016

(54) FUEL CELL ELECTRODE CATALYST HAVING GRADUATED LAYERS

(71) Applicant: Nissan North America, Inc., Franklin, TN (US)

(72) Inventors: Nilesh Dale, Novi, MI (US); Ellazar Nianagar, Redford, MI (US)

(73) Assignee: Nissan North America, Inc., Franklin, TN (US)

( * ) Notice: Subject to any disclaimer, the term of this patent is extended or adjusted under 35 U.S.C. 154(b) by 163 days.

(21) Appl. No.: 14/052,819

(22) Filed: Oct. 14, 2013

(65) Prior Publication Data

US 2015/0104728 A1    Apr. 16, 2015

(51) Int. Cl.
  *H01M 4/90*  (2006.01)
  *H01M 8/10*  (2016.01)
  *H01M 4/86*  (2006.01)

(52) U.S. Cl.
  CPC ......... *H01M 4/9075* (2013.01); *H01M 4/8657* (2013.01); *H01M 8/1004* (2013.01); *H01M 2008/1095* (2013.01); *H01M 2300/0082* (2013.01); *Y02E 60/521* (2013.01)

(58) Field of Classification Search
  None
  See application file for complete search history.

(56) References Cited

U.S. PATENT DOCUMENTS

| | | | |
|---|---|---|---|
| 4,927,514 A | 5/1990 | Solomon et al. | |
| 5,500,292 A | 3/1996 | Muranaka et al. | |
| 5,607,785 A | 3/1997 | Tozawa et al. | |
| 6,106,965 A | 8/2000 | Hirano et al. | |
| 6,287,717 B1 | 9/2001 | Cavalca et al. | |
| 6,528,201 B1 | 3/2003 | Hitomi | |
| 6,855,453 B2 | 2/2005 | Bett et al. | |
| 6,916,575 B2 | 7/2005 | Hori et al. | |
| 7,097,932 B1 | 8/2006 | Sakai et al. | |
| 7,462,575 B2 | 12/2008 | Hommura et al. | |
| 7,473,486 B2 | 1/2009 | Yoshimura et al. | |
| 7,901,836 B2 | 3/2011 | Ohma et al. | |
| 8,105,732 B2 | 1/2012 | Ueda et al. | |
| 8,148,026 B2 | 4/2012 | Oh et al. | |
| 8,288,054 B2 | 10/2012 | Motupally et al. | |
| 2002/0068213 A1 | 6/2002 | Kaiser et al. | |

(Continued)

FOREIGN PATENT DOCUMENTS

| | | |
|---|---|---|
| JP | 19930251086 A | 9/1993 |
| JP | 19970265993 A | 9/1997 |

(Continued)

OTHER PUBLICATIONS

Feng, Xuhui, et al.; "Multi-layer configuration for the cathode electrode of polymer electrolyte fuel cell", Electrochimica Acta 55 (2010) 4579-4586 (8 pp).

*Primary Examiner* — Miriam Stagg
*Assistant Examiner* — Haroon S Sheikh
(74) *Attorney, Agent, or Firm* — Young Basile Hanlon & MacFarlane, P.C.

(57) ABSTRACT

Embodiments of electrode assemblies and fuel cells having increased catalyst durability are provided. One embodiment of an electrode assembly for a fuel cell comprises a first catalyst layer adjacent an electrolyte membrane comprising first active catalyst particles supported on first support particles having a first support size and a second catalyst layer adjacent the first catalyst layer opposite the electrolyte membrane comprising second active catalyst particles supported on second support particles having a second support size. The first support particles are a non-carbon support.

9 Claims, 5 Drawing Sheets

(56) References Cited

U.S. PATENT DOCUMENTS

| | | |
|---|---|---|
| 2002/0107140 A1* | 8/2002 | Hampden-Smith et al. . 502/185 |
| 2002/0192539 A1 | 12/2002 | Kobayashi et al. |
| 2004/0038808 A1 | 2/2004 | Hampden-Smith et al. |
| 2004/0265665 A1 | 12/2004 | Yan et al. |
| 2006/0257715 A1 | 11/2006 | Ueda |
| 2007/0099066 A1 | 5/2007 | Okumura et al. |
| 2007/0231675 A1 | 10/2007 | Son |
| 2007/0269699 A1 | 11/2007 | Pak et al. |
| 2008/0206616 A1* | 8/2008 | Atanassova et al. ........... 429/30 |
| 2009/0136802 A1 | 5/2009 | Sasaki et al. |
| 2010/0159298 A1 | 6/2010 | Haug |
| 2012/0196205 A1 | 8/2012 | Park et al. |
| 2013/0022891 A1 | 1/2013 | Chuy et al. |
| 2014/0349203 A1* | 11/2014 | Klose-Schubert .... H01M 4/923 429/418 |
| 2014/0356757 A1* | 12/2014 | Protsailo ............. H01M 8/1004 429/480 |

FOREIGN PATENT DOCUMENTS

| | | |
|---|---|---|
| JP | 2002298860 A | 10/2002 |
| JP | 2003303596 A | 10/2003 |
| JP | 2004047454 A | 2/2004 |
| JP | 2004192950 A | 7/2004 |
| JP | 2004349037 A | 12/2004 |
| JP | 2005032528 A | 2/2005 |
| JP | 2006049184 A | 2/2006 |
| JP | 2006049187 A | 2/2006 |
| JP | 2006079917 A | 3/2006 |
| JP | 2007305427 A | 11/2007 |
| WO | 0122514 A1 | 3/2001 |
| WO | 2010075321 A1 | 7/2010 |

* cited by examiner

FUEL CELL ELECTRODE CATALYST HAVING GRADUATED LAYERS

TECHNICAL FIELD

The invention relates to the field of improving fuel cell catalyst durability, and in particular to improving catalyst durability by including layers of catalyst with graduated corrosion resistance and/or active particle dissolution mitigation.

BACKGROUND

Fuel cells efficiently and electrochemically convert fuel into electric current, which may then be used to power electric circuits, such as drive systems for vehicles. A fuel cell containing a proton exchange membrane is an electrochemical device that converts chemical energy to electrical energy using, for example, hydrogen or methane as fuel and oxygen/air as oxidant. A typical fuel cell membrane electrode assembly includes a solid polymer electrolyte proton conducting membrane between two electrodes.

Catalysts are used to enhance the rate of the electrochemical reactions which occur at the electrodes. Catalysts typically include noble metals such as platinum carried by a support particle. To achieve the greatest catalytic activity per unit weight, the noble metal generally has an extremely high surface area. However, the high surface area noble metal catalyst materials are subject to dissolution and agglomeration while the support particles are subject to corrosion. Therefore, there is a need to improve the durability of the catalyst used in the fuel cell electrode.

SUMMARY

Disclosed herein are embodiments of electrode assemblies and fuel cells comprising the electrode assemblies. One embodiment of an electrode assembly for a fuel cell comprises a first catalyst layer adjacent an electrolyte membrane comprising first active catalyst particles supported on first support particles having a first support size and a second catalyst layer adjacent the first catalyst layer opposite the electrolyte membrane comprising second active catalyst particles supported on second support particles having a second support size. The first support particles are a non-carbon support.

Another embodiment of an electrode assembly as disclosed herein comprises a first catalyst layer adjacent an electrolyte membrane comprising first active catalyst particles supported on first support particles having a first support size, a second catalyst layer adjacent the first catalyst layer opposite the electrolyte membrane comprising second active catalyst particles supported on second support particles having a second support size and a third catalyst layer adjacent the second catalyst layer opposite the first catalyst layer and comprising third active catalyst particles supported on third support particles having a third support size. The first support size is larger than the second support size which is larger than the third support size.

An embodiment of a fuel cell disclosed herein comprises a cathode electrode and an electrolyte membrane. The cathode electrode comprises a first catalyst layer adjacent the electrolyte membrane comprising first active catalyst particles having a first particle size supported on first support particles having a first support size, a second catalyst layer adjacent the first catalyst layer opposite the electrolyte membrane comprising second active catalyst particles having a second particle size supported on second support particles having a second support size and a third catalyst layer adjacent the second catalyst layer opposite the first catalyst layer and comprising third active catalyst particles having a third particle size supported on third support particles having a third support size. The first support particles and the second support particles are a non-carbon support consisting essentially of at least one of metal oxides, metal nitrides, and metal oxynitrides. The first particle size is larger than the second particle size, which is larger than the third particle size. The first support size is larger than the second support size which is larger than the third support size.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Included in the drawings are the following figures.

DETAILED DESCRIPTION

Disclosed herein are electrode assemblies having graduated catalyst layers configured to improve catalyst durability and decrease catalyst agglomeration. Also disclosed are fuel cells incorporating such electrode assemblies.

Proton exchange membrane fuel cells are electrochemical devices converting chemical energy to electrical energy by using hydrogen as a fuel and oxygen/air as an oxidant. The proton exchange membrane fuel cell has a fuel cell membrane electrode assembly generally comprising five layers, including a solid polymer electrolyte proton conducting membrane, two gas diffusion layers, and two catalyst layers.

Figure 1:
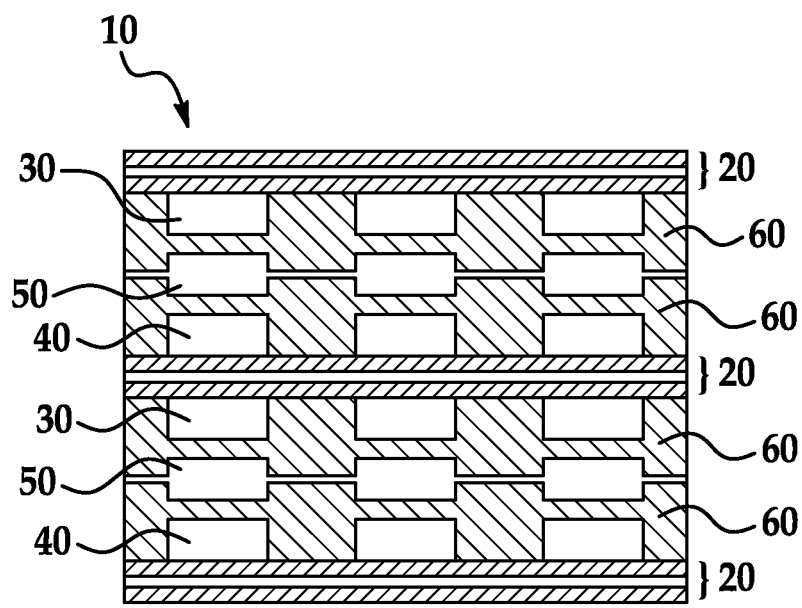
FIG. 1 is a schematic cross-sectional illustration of a basic fuel cell stack having multiple gas diffusion electrodes.

FIG. 1 shows a schematic cross-sectional illustration of a portion of a fuel cell stack 10. The illustration is provided as an example of the use of a proton exchange membrane, also referred to herein as a membrane, in fuel cells and is not meant to be limiting.

The fuel cell stack 10 is comprised of multiple membrane electrode assemblies 20. Fuel 30 such as hydrogen is fed to the anode side of a membrane electrode assembly 20, while an oxidant 40 such as oxygen or air is fed to the cathode side of the membrane electrode assembly 20. Coolant 50 is supplied between the fuel 30 and oxidant 40, the coolant 50 separated from the fuel 30 and oxidant 40 by separators 60.

Figure 2:
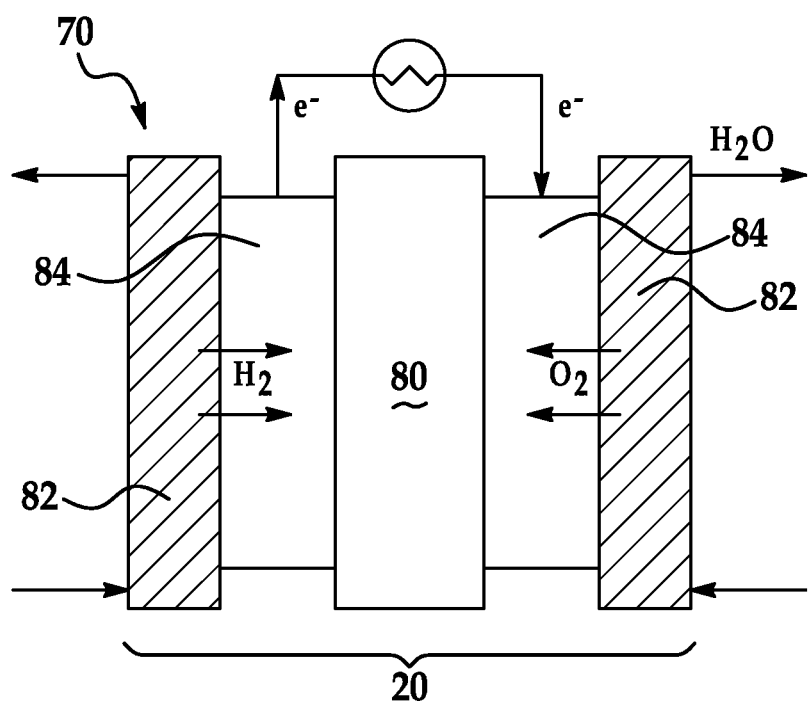
FIG. 2 is an enlarged schematic cross-sectional view of a membrane electrode assembly from the fuel cell stack of FIG. 1.

FIG. 2 is an illustration of one of the plurality of fuel cells 70 in the fuel cell stack 10. The fuel cell 70 is comprised of a single membrane electrode assembly 20. The membrane electrode assembly 20 has a membrane 80 with a gas diffusion layer 82 on opposing sides of the membrane 80. Between the membrane 80 and each gas diffusion layer 82 is a catalyst layer 84. The catalyst layer 84 can be formed on the membrane 80. Alternatively, a gas diffusion electrode is made by forming a catalyst layer 84 on a surface of each gas diffusion layer 82 and sandwiching the membrane 80 between the gas diffusion layers 82 such that the catalyst layers 84 contact the membrane 80. When fuel 30, such as hydrogen gas, is introduced into the fuel cell 70, the catalyst layer 84 at the anode splits hydrogen gas molecules into protons and electrons. The protons pass through the membrane 80 to react with the oxidant 40, such as air, forming water ($H_2O$). The electrons ($e^-$), which cannot pass through the membrane 80, must travel around it, thus creating the source of electrical energy.

Proton exchange membrane fuel cells typically use a catalyst having an active catalyst particle, such as platinum, supported on a carbon support as cathode and anode catalysts. Under fuel cell operating conditions, the catalyst is susceptible to degradation due to carbon support corrosion as well as active catalyst particle dissolution.

During typical automotive start up and shut down conditions, the cathode potential can reach up to 1.5 V. With this high potential, the cathode carbon support corrodes, degrading the catalyst performance. During potential cycling, carbon oxidizes to form surface oxide species that can be completely oxidized to carbon dioxide, as generalized by the following equation:

$$C + 2H_2O \rightarrow CO_2 + 4H^+ + 4e^-$$

Carbon corrosion and generation of carbon dioxide is a major problem in fuel cells because it can lead to loss of catalyst activity, carbon support loss, and degradation of the electrode structure. Carbon corrosion is more severe at the membrane/electrode interface because, at this junction, there is a high concentration of water, a reactant in the carbon corrosion oxidation reaction shown above. The proton conducting membrane in the fuel cell is hydrated during operation, resulting in the high amounts of water at the membrane/electrode interface.

During normal driving operation of the vehicle, peak load to idle condition, the active catalyst particles, such as platinum, in the catalyst agglomerates, i.e., dissolves and redisposes, which leads to activity loss and thus performance loss. Size of the active catalyst particles plays an important role in dictating the performance and durability of the catalyst. A particle size in the range of about 2.5 to 3.0 nanometers is typically desired to realize the highest activity, providing a high electrochemically active area and, in turn, superior fuel cell performance. However, these smaller nano-particles are unstable and tend to agglomerate under normal driving conditions, leading to loss of performance. Larger particle sizes provide a smaller electrochemically active area but are more thermodynamically stable. Active catalyst particles of the larger sizes do not tend to agglomerate.

Active catalyst particle dissolution occurs greater in high reaction areas. As indicated by current density distribution across the catalyst layer thickness, hydrogen oxidation reaction at the anode and oxygen reduction reaction at the cathode occur more readily proximate the membrane/catalyst interface than in other regions of the catalyst layer. Therefore, during operation of the vehicle, the active catalyst particles near the membrane/catalyst interface agglomerate, resulting in larger active catalyst particles with decreased active surface area.

The embodiments herein improve catalyst durability by one or both of mitigating carbon corrosion in the catalyst layer and mitigating active catalyst particle agglomeration. These are achieved by providing an electrode having graduated catalyst layers. The embodiments herein have catalyst layers with one or both of graduated support and graduated active catalyst particles.

Figure 3:
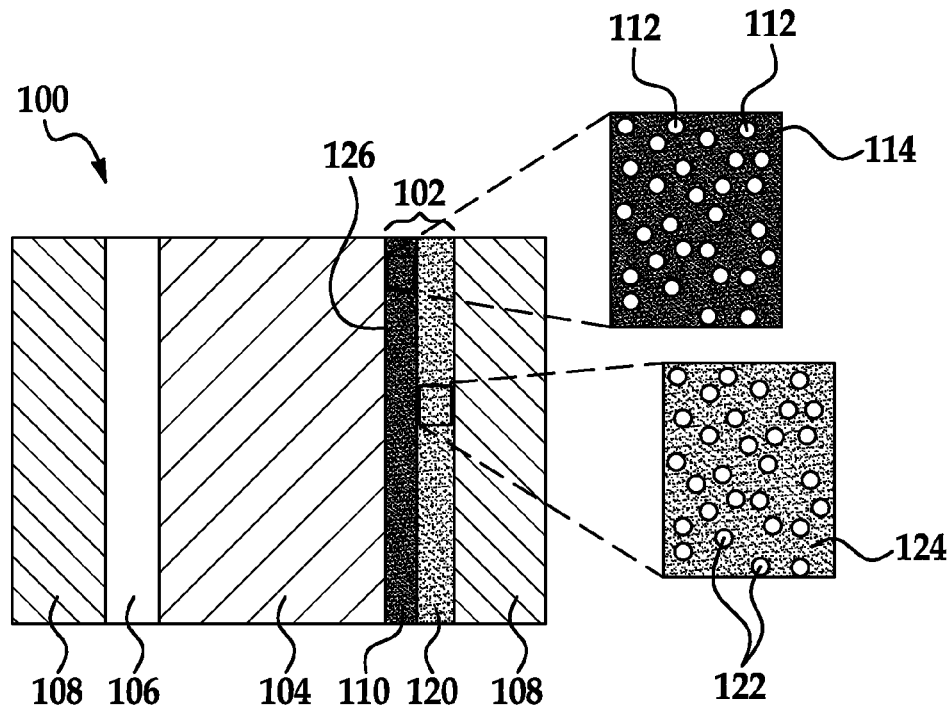
FIG. 3 is a schematic of an embodiment of an electrode assembly having a graduated electrode catalyst disclosed herein.

One embodiment of an electrode assembly 100 for a fuel cell is illustrated in FIG. 3. The membrane electrode assembly, or electrode assembly 100, comprises graduated electrode catalyst 102 having a first catalyst layer 110 adjacent an electrolyte membrane 104 and comprises first active catalyst particles 112 supported on first support particles 114 having a first support size. A second catalyst layer 120 is adjacent the first catalyst layer 110 opposite the electrolyte membrane 104. The second catalyst layer 120 comprises second active catalyst particles 122 supported on second support particles 124 having a second support size. The first support particles 114 are a non-carbon support. The membrane electrode assembly further comprises a second electrode catalyst layer 106 on the opposite side of the membrane 104 from the first catalyst layer 110. Gas diffusion layers 108 make up the outermost layers of the electrode assembly 100.

The first active catalyst particles 112 and the second active catalyst particles 122 can be one or more precious metals such as platinum, gold, rhodium, ruthenium, palladium and iridium, transition metals such as cobalt and nickel, alloys, core shells, non-precious metal catalyst and combinations thereof. In this first embodiment, the first active catalyst particles 112 and the second active catalyst particles 122 are the same particle size. For example, the particle size of each of the first active catalyst particles 112 and the second active catalyst particles 122 can be greater than about 3.5 nanometers, and preferably from about 4.0 to 6.0 nanometers. As another example, the particle size of each of the first active catalyst particles 112 and the second active catalyst particles 122 can be less than about 4 nanometers, and preferably from about 2.0 to 3.5 nanometers.

When support particles or active catalyst particles of different catalyst layers are indicated to be the same size, as used herein, the catalyst in the different catalyst layers is produced with a single range of particle sizes. Reference to the "same size" does not limit each particle within the layers to be one size only. Rather, the "same size" refers to the same range of sizes. When particle sizes are indicated as being larger or smaller than other particle sizes, as used herein, one particle size range is larger or smaller than the other particle size range. In other words, particles within one layer will be within one range of sizes while particles in another layer will be within another range of sizes.

In the embodiment in FIG. 3, both the first support particles 114 and the second support particles 124 are a non-carbon support consisting essentially of at least one of metal oxides, metal nitrides, and metal oxynitrides. However, the size of the first support particles 114 is greater than the size of the second support particles 124. With this configuration, the most corrosion resistant support, i.e., the support having the largest size and the lowest surface area, is at the membrane/catalyst interface 126 where the corrosion potential is greatest. The second support particles 124 having the higher surface area and greater porosity are proximate the gas diffusion layer 108, assisting in gas transport from the gas diffusion layer 108.

The size of the first support particles 114 can be between about 50 and 100 nanometers and the size of the second support particles 124 can be less than 50 nanometers. The size of the first support particles 114 can be between about 40 and 50 nanometers and the size of the second support particles 124 can be less than 40 nanometers, such as between about 20 and 30 nanometers.

The support particles can be designated based on surface area rather than size. In the embodiment in FIG. 3, the surface area of the first support particles 114 is lower than the surface area of the second support particles 124. For example, the surface area of the first support particles 114 can be between about 30 and 50 $m^2/g$ and the surface area of the second support particles 124 can be between about 60 and 100 $m^2/g$. The surface area of the first support particles 114 can be between about 60 and 100 $m^2/g$ and the surface area of the second support particles 124 can be greater than about 100 $m^2/g$.

The graduated electrode catalyst 102 can be the cathode electrode catalyst. However, it is contemplated that a graduated electrode catalyst 102 can be used for both the cathode and anode electrode catalyst.

Figure 4:
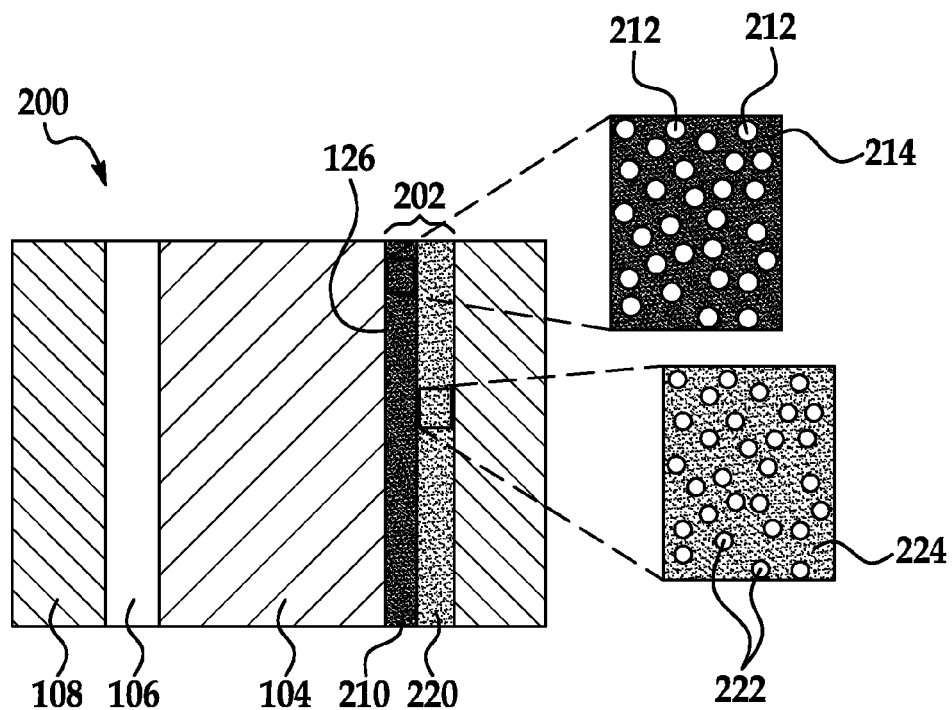
FIG. 4 is a schematic of another embodiment of an electrode assembly having another graduated electrode catalyst disclosed herein.

FIG. 4 is another embodiment of an electrode assembly 200 for a fuel cell. Similar elements also found in FIG. 3 will be referenced with the same number for clarity. The electrode assembly 200 comprises graduated electrode catalyst 202 having a first catalyst layer 210 adjacent an electrolyte membrane 104 and comprises first active catalyst particles 212 supported on first support particles 214 having a first support size. A second catalyst layer 220 is adjacent the first catalyst layer 210 opposite the electrolyte membrane 104. The second catalyst layer 220 comprises second active catalyst particles 222 supported on second support particles 224 having a second support size. The first support particles 214 are a non-carbon support. The membrane electrode assembly 200 further comprises a second electrode catalyst layer 106 on the opposite side of the membrane 104 from the first catalyst layer 210. Gas diffusion layers 108 make up the outermost layers of the electrode assembly 200.

As with the first embodiment, both the first support particles 214 and the second support particles 224 are a non-carbon support consisting essentially of at least one of metal oxides, metal nitrides, and metal oxynitrides. The size of the first support particles 214 is greater than the size of the second support particles 224. The size of the first support particles 214 can be between about 50 and 100 nanometers and the size of the second support particles 224 can be less than 50 nanometers. The size of the first support particles 214 can be between about 40 and 50 nanometers and the size of the second support particles 224 can be less than 40 nanometers, such as between about 20 and 30 nanometers. As with the embodiment of FIG. 3, the support particles can be designated based on surface area rather than size. In the embodiment in FIG. 4, the surface area of the first support particles 214 is lower than the surface area of the second support particles 224. For example, the surface area of the first support particles 214 can be between about 30 and 50 $m^2/g$ and the surface area of the second support particles 224 can be between about 60 and 100 $m^2/g$. The surface area of the first support particles 214 can be between about 60 and 100 $m^2/g$ and the surface area of the second support particles 224 can be greater than about 100 $m^2/g$.

The first active catalyst particles 212 and the second active catalyst particles 222 can be one or more precious metals such as platinum, gold, rhodium, ruthenium, palladium and iridium, transition metals such as cobalt and nickel, alloys, core shells, non-precious metal catalyst and combinations thereof. In this embodiment shown in FIG. 4, the first active catalyst particles 212 have a first particle size and the second active catalyst particles 222 have a second particle size. The first particle size is larger than the second particle size. For example, the particle size of the first active catalyst particles 212 can be greater than about 3.5 nanometers and preferably between about 4.0 and 6.0 nanometers, while the particle size of the second active catalyst particles 222 can be less than about 4.0 nanometers, and preferably between about 2.0 and 3.5 nanometers.

Having active catalyst particles 212 of a larger size and lower surface area near the membrane/catalyst interface 126 suppresses active catalyst particle dissolution and agglomeration in the region where current density is higher than other areas in the catalyst layer.

The graduated electrode catalyst 202 can be the cathode electrode catalyst. However, it is contemplated that a graduated electrode catalyst 202 can be used for both the cathode and anode electrode catalyst.

Figure 5:
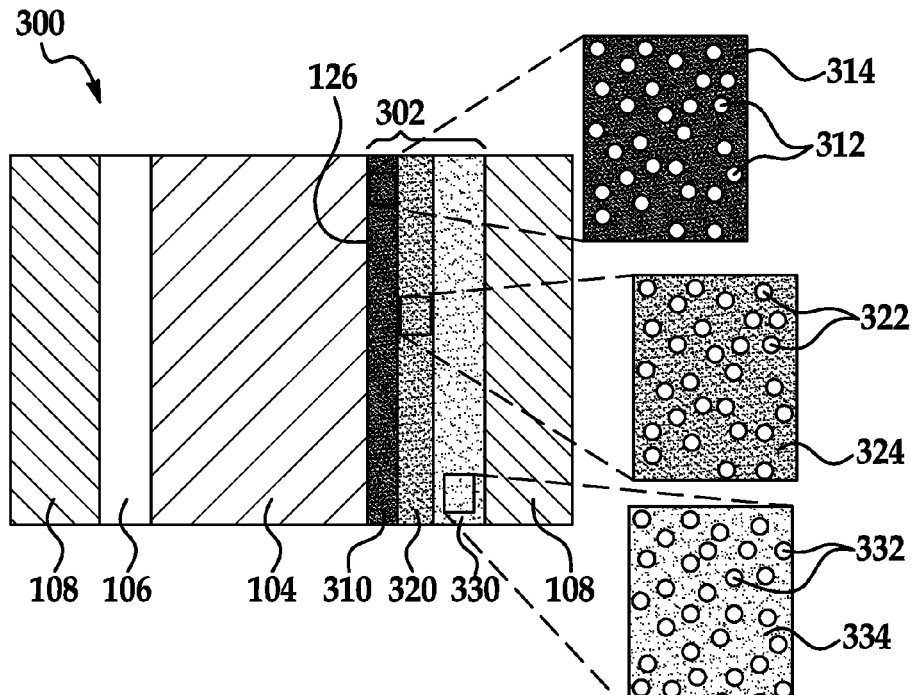
FIG. 5 is a schematic of a third embodiment of an electrode assembly having yet another graduated electrode catalyst disclosed herein.

FIG. 5 illustrates another embodiment of an electrode assembly 300. Similar elements also found in FIGS. 3 and 4 will be referenced with the same number for clarity. The electrode assembly 300 comprises graduated electrode catalyst 302 having a first catalyst layer 310 adjacent the electrolyte membrane 104 comprising first active catalyst particles 312 supported on first support particles 314 having a first support size. A second catalyst layer 320 is adjacent the first catalyst layer 310 opposite the electrolyte membrane 104 and comprises second active catalyst particles 322 supported on second support particles 324 having a second support size. A third catalyst layer 330 is adjacent the second catalyst layer 320 opposite the first catalyst layer 310 and comprises third active catalyst particles 332 supported on third support particles 334 having a third support size. The electrode assembly 300 further comprises a second electrode catalyst layer 106 on the opposite side of the membrane 104 from the first catalyst layer 310. Gas diffusion layers 108 make up the outermost layers of the electrode assembly 300.

In the embodiment shown in FIG. 5, the first active catalyst particles 312, the second active catalyst particles 322 and the third active catalyst particles 332 can be one or more precious metals such as platinum, gold, rhodium, ruthenium, palladium and iridium, transition metals such as cobalt and nickel, alloys, core shells, non-precious metal catalyst and combinations thereof. In this third embodiment, the first active catalyst particles 312, the second active catalyst particles 322 and the third active catalyst particles 332 are the same particle size. For example, the particle size of each of the first active catalyst particles 312, the second active catalyst particles 322 and the third active catalyst particles 332 can be greater than about 3.5 nanometers, and preferably from about 4.0 to 6.0 nanometers. As another example, the particle size of each of the first active catalyst particles 312, the second active catalyst particles 322 and the third active catalyst particles 332 can be less than about 4.0 nanometers and preferably from about 2.0 to 3.5 nanometers.

In the embodiment shown in FIG. 5, the first support particles 314 are a non-carbon support. For example, the first support particles 314 consist essentially of at least one of metal oxides, metal nitrides, and metal oxynitrides. In one aspect of this third embodiment, the second support particles 324 and the third support particles 334 can also be non-carbon support consisting essentially of at least one of metal oxides, metal nitrides, and metal oxynitrides.

In the third embodiment, the size of the first support particles 314 is greater than the size of the second support particles 324, which in turn is larger than the size of the third support particles 334. In other words, the first support particles 314 are of a larger size, the second support particles 324 are of a medium size and the third support particles 334 are of a smaller size. The size of the first support particles 314 can be between about 50 and 100 nanometers, the size of the second support particles 324 can be between about 40 and 50 nanometers and the size of the third support particles 334 can be less than 40 nanometers, or from between about 20 and 30 nanometers.

As with the embodiment of FIG. 3, the support particles can be designated based on surface area rather than size. In the embodiment in FIG. 5, the surface area of the first support particles 314 is lower than the surface area of the second support particles 324, which in turn is lower than the surface area of the third support particles 334. With the three layers 310, 320, 330 having non-carbon support, the surface area of the first support particles 314 can be less than 60 $m^2/g$, or between about 30 and 50 $m^2/g$, the surface area of the second support particles 324 can be between about 60 and 100 $m^2/g$, and the surface area of the third support particles 334 can be greater than about 100 $m^2/g$.

In another aspect of the third embodiment, the second support particles 324 can be non-carbon support along with the first support particles 314 and can consist essentially of at least one of metal oxides, metal nitrides, and metal oxynitrides. The third support particles 334 are carbon with a high surface area. Again, the size of the first support particles 314 is greater than the size of the second support particles 324, which in turn is larger than the size of the third support particles 334. The size of the first support particles 314 can be between about 50 and 100 nanometers, the size of the second support particles 324 can be between about 40 and 50 nanometers and the size of the third support particles 334 can be less than 40 nanometers, or from between about 20 and 30 nanometers.

The surface area of the first support particles 314 is lower than the surface area of the second support particles 324, which in turn is lower than the surface area of the third support particles 334. With the first two layers 310, 320 having non-carbon support and the third layer 330 being carbon, the surface area of the first support particles 314 can be less than 60 $m^2/g$, or between about 30 and 50 $m^2/g$, the surface area of the second support particles 324 can be between about 60 and 100 $m^2/g$, and the surface area of the third support particles 334 can be greater than about 200 $m^2/g$.

In another aspect of the third embodiment, both the second support particles 324 and the third support particles 334 are carbon. For example, the second support particles 324 can be graphitized carbon while the third support particles 334 are high surface area carbon. Again, the size of the first support particles 314 is greater than the size of the second support particles 324, which in turn is larger than the size of the third support particles 334. The size of the first support particles 314 can be between about 50 and 100 nanometers, the size of the second support particles 324 can be between about 40 and 50 nanometers and the size of the third support particles 334 can be less than 40 nanometers, or from between about 20 and 30 nanometers.

The surface area of the first support particles 314 is lower than the surface area of the second support particles 324, which in turn is lower than the surface area of the third support particles 334. With the first layer 310 having non-carbon support and the second and third layers 320, 330 being carbon, the surface area of the first support particles 314 can be less than 60 $m^2/g$, or between about 30 and 50 $m^2/g$, the surface area of the second support particles 324 can be between about 60 and 200 $m^2/g$ or between about 100 and 200 $m^2/g$, and the surface area of the third support particles 334 can be greater than about 200 $m^2/g$.

With the catalyst electrode configuration of each aspect of the third embodiment, the most corrosion resistant support, i.e., the support having the largest size and the lowest surface area, is at the membrane/catalyst interface 126 where the corrosion potential is greatest. The third support particles 334 having the highest surface area and greater porosity are proximate the gas diffusion layer 108, assisting in gas transport from the gas diffusion layer 108. The selection of material for the second and third catalyst layers 320, 330 will depend on many variables, including but not limited to, type of fuel cell, thickness requirements, cost requirements, performance requirements, required life of fuel cell, etc.

Figure 6:
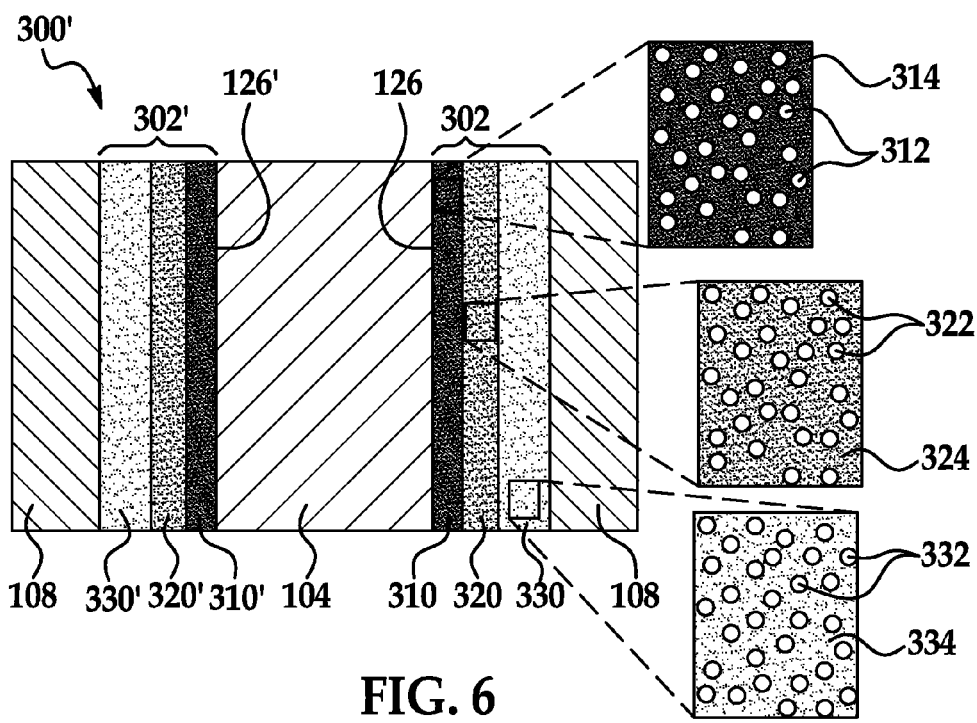
FIG. 6 is a schematic of the third embodiment of an electrode assembly having graduated electrode catalyst as both electrodes.

The graduated electrode catalyst 302 can be the cathode electrode catalyst. However, it is contemplated that a graduated electrode catalyst 302 can be used for both the cathode and anode electrode catalyst. This is illustrated in FIG. 6. FIG. 6 illustrates the embodiment of FIG. 5 but with the second electrode catalyst layer 106 replaced with another graduated electrode catalyst 302' so that both the anode and cathode catalyst layers are graduated electrode catalyst 302, 302'. As illustrated in FIG. 6, the graduated electrode catalyst 302' of the anode mirrors the graduated electrode catalyst 302 of the cathode. In other words, the first catalyst layer 310' is adjacent the electrolyte membrane 104, the second catalyst layer 320' is adjacent the first catalyst layer 310' opposite the electrolyte membrane 104, and the third catalyst layer 330' is adjacent the second catalyst layer 320' opposite the first catalyst layer 310'.

With the catalyst electrode configuration shown in FIG. 6, the most corrosion resistant support, i.e., the support having the largest size and the lowest surface area, is at the membrane/catalyst interfaces 126, 126' where the corrosion potential is greatest. The third catalyst layers 330, 330' having the highest surface area and greater porosity are proximate the gas diffusion layers 108, assisting in gas transport from the gas diffusion layers 108.

Figure 7:
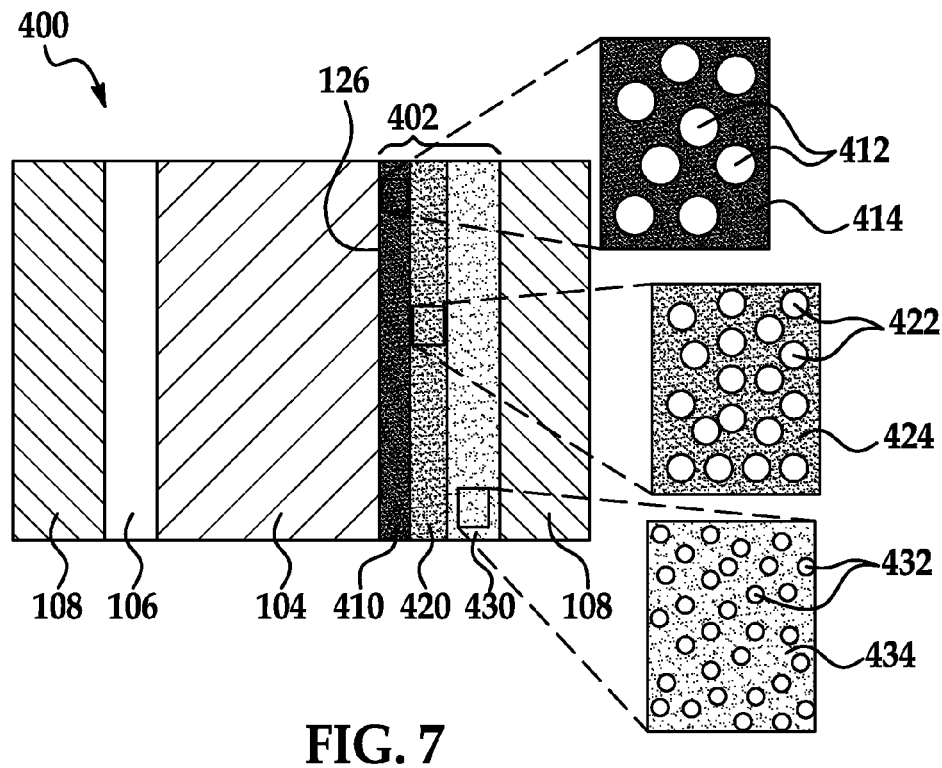
FIG. 7 is a schematic of a fourth embodiment of an electrode assembly having another graduated electrode catalyst disclosed herein.

FIG. 7 is another embodiment of an electrode assembly 400 for a fuel cell. Similar elements also found in FIG. 5 will be referenced with the same number for clarity. The electrode assembly 400 comprises graduated electrode catalyst 402 having a first catalyst layer 410 adjacent the electrolyte membrane 104 comprising first active catalyst particles 412 supported on first support particles 414 having a first support size. A second catalyst layer 420 is adjacent the first catalyst layer 410 opposite the electrolyte membrane 104 and comprises second active catalyst particles 422 supported on second support particles 424 having a second support size. A third catalyst layer 430 is adjacent the second catalyst layer 420 opposite the first catalyst layer 410 and comprises third active catalyst particles 432 supported on third support particles 434 having a third support size. The electrode assembly 400 further comprises a second electrode catalyst layer 106 on the opposite side of the membrane 104 from the first catalyst layer 410. Gas diffusion layers 108 make up the outermost layers of the electrode assembly 400.

In the fourth embodiment, the size of the first support particles 414 is greater than the size of the second support particles 424, which in turn is larger than the size of the third support particles 434. Similarly, the surface area of the first support particles 414 is lower than the surface area of the second support particles 424, which in turn is lower than the surface area of the third support particles 434. Any of the aspects of the support particles discussed with reference to FIG. 5 can be incorporated into the fourth embodiment.

In the embodiment shown in FIG. 7, the first active catalyst particles 412, the second active catalyst particles 422 and the third active catalyst particles 432 can be one or more precious metals such as platinum, gold, rhodium, ruthenium, palladium and iridium, transition metals such as cobalt and nickel, alloys, core shells, non-precious metal catalyst and combinations thereof. In this fourth embodiment, the first active catalyst particles 412 have a first particle size, the second active catalyst particles 422 have a second particle size and the third active catalyst particles 432 have a third particle size. The first particle size is larger than the second particle size, which in turn is larger than the third particle size. For example, the particle size of the first active catalyst particles 412 can be from about 5.0 to 6.0 nanometers while the particle size of the second active catalyst particles 422 can be from about 3.0 to 5.0 nanometers. The particle size of the third active catalyst particles 432 can be from about 1.0 to 3.0 nanometers.

Having active catalyst particles 412 of a larger size and lower surface area near the membrane/catalyst interface 126 suppresses active catalyst particle dissolution and agglomeration in the region where current density is higher than other areas in the catalyst layer.

The graduated electrode catalyst 402 can be the cathode electrode catalyst. However, it is contemplated that a graduated electrode catalyst 402 can be used for both the cathode and anode electrode catalyst.

Figure 8:
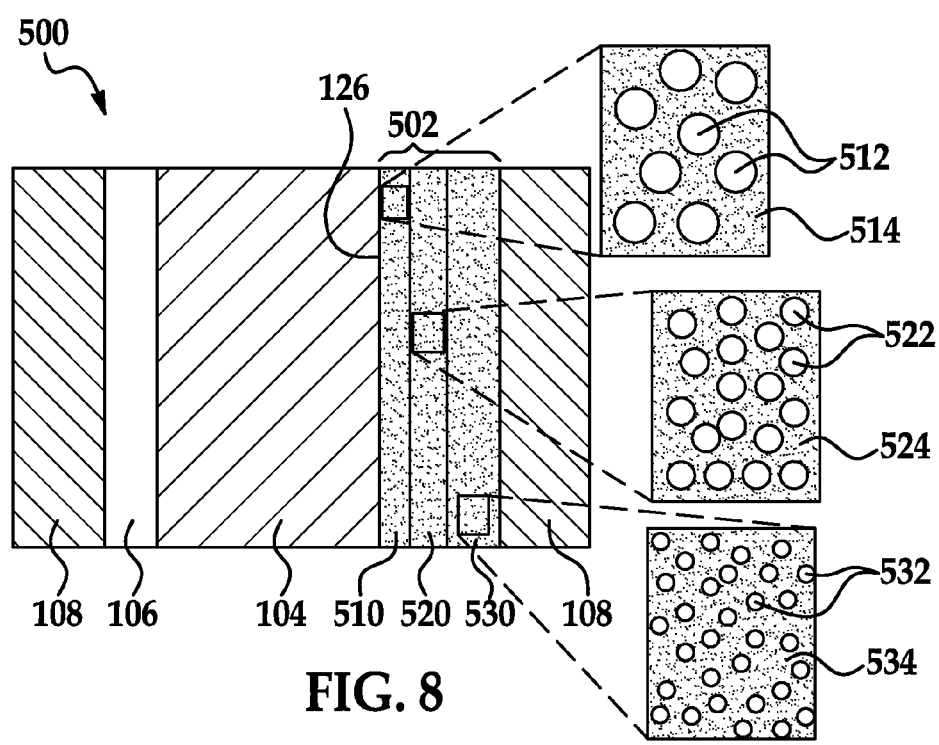
FIG. 8 is a schematic of a fifth embodiment of an electrode assembly having another graduated electrode catalyst disclosed herein.

FIG. 8 is another embodiment of an electrode assembly 500 for a fuel cell. Similar elements also found in FIG. 7 will be referenced with the same number for clarity. The electrode assembly 500 comprises graduated electrode catalyst 502 having a first catalyst layer 510 adjacent the electrolyte membrane 104 comprising first active catalyst particles 512 supported on first support particles 514 having a first support size. A second catalyst layer 520 is adjacent the first catalyst layer 510 opposite the electrolyte membrane 104 and comprises second active catalyst particles 522 supported on second support particles 524 having a second support size. A third catalyst layer 530 is adjacent the second catalyst layer 520 opposite the first catalyst layer 510 and comprises third active catalyst particles 532 supported on third support particles 534 having a third support size. The electrode assembly 500 further comprises a second electrode catalyst layer 106 on the opposite side of the membrane 104 from the first catalyst layer 510. Gas diffusion layers 108 make up the outermost layers of the electrode assembly 500.

In the embodiment shown in FIG. 8, the first support particles 514, the second support particles 524 and the third support particles 534 are non-carbon support consisting essentially of at least one of metal oxides, metal nitrides, and metal oxynitrides. The size of the first support particles 514, the second support particles 524 and the third support particles 534 are the same. The size of the first support particles 514, the second support particles 524 and the third support particles 534 can be between about 40 and 50 nanometers, can be less than 40 nanometers, or can be from between about 20 and 30 nanometers.

The support particles can be designated based on surface area rather than size. In the embodiment in FIG. 8, the surface area of the first support particles 514, the second support particles 524 and the third support particles 534 is also the same. The surface area of the first support particles 514, the second support particles 524 and the third support particles 534 can be between about 60 and 100 $m^2/g$, or can be greater than about 100 $m^2/g$.

In the embodiment shown in FIG. 8, the first active catalyst particles 512, the second active catalyst particles 522 and the third active catalyst particles 532 can be one or more precious metals such as platinum, gold, rhodium, ruthenium, palladium and iridium, transition metals such as cobalt and nickel, alloys, core shells, non-precious metal catalyst and combinations thereof. In this fifth embodiment, the first active catalyst particles 512 have a first particle size, the second active catalyst particles 522 have a second particle size and the third active catalyst particles 532 have a third particle size. The first particle size is larger than the second particle size, which in turn is larger than the third particle size. For example, the particle size of the first active catalyst particles 512 can be from about 5.0 to 6.0 nanometers while the particle size of the second active catalyst particles 522 can be from about 3.0 to 5.0 nanometers. The particle size of the third active catalyst particles 532 can be from about 1.0 to 3.0 nanometers.

Having active catalyst particles 512 of a larger size and lower surface area near the membrane/catalyst interface 126 suppresses active catalyst particle dissolution and agglomeration in the region where current density is higher than other areas in the catalyst layer.

Figure 9:
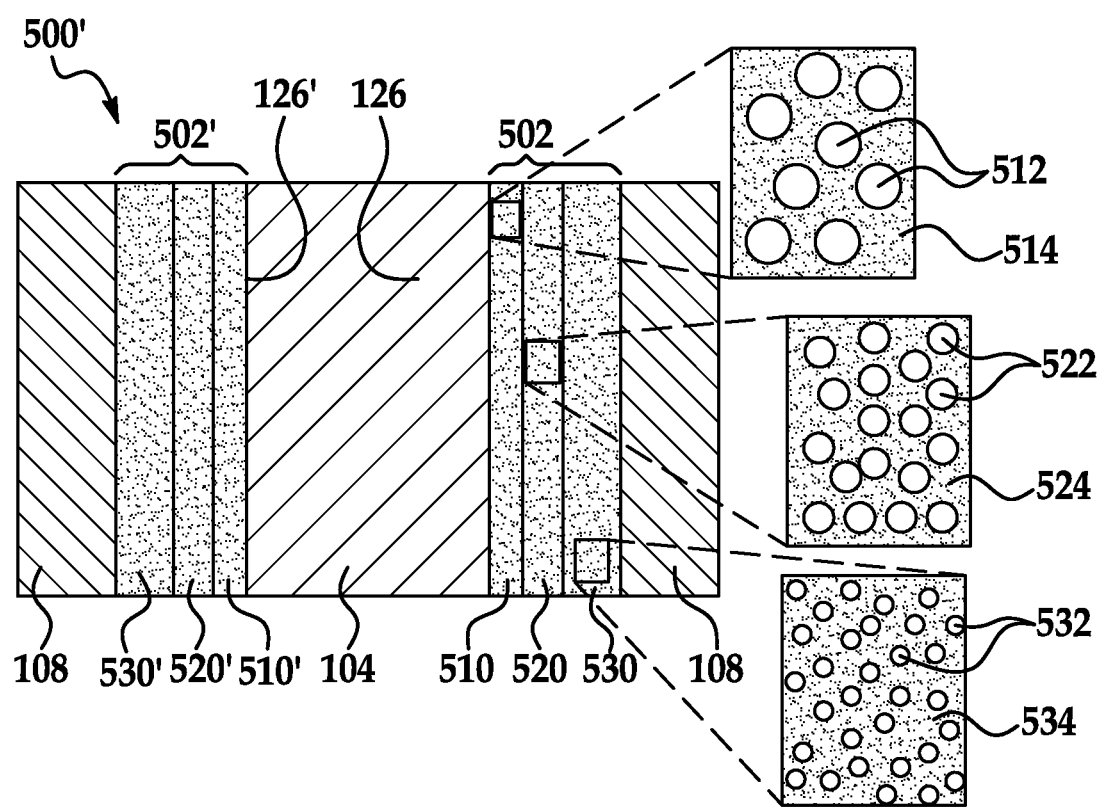
FIG. 9 is a schematic of the fifth embodiment of an electrode assembly having graduated electrode catalyst as both electrodes.

The graduated electrode catalyst 502 can be the cathode electrode catalyst. However, it is contemplated that a graduated electrode catalyst 502 can be used for both the cathode and anode electrode catalyst. This is illustrated in FIG. 9, which illustrates the embodiment of FIG. 8 but with the second electrode catalyst layer 106 replaced with another graduated electrode catalyst 502' so that both the anode and cathode catalyst layers are graduated electrode catalyst 502, 502'. As illustrated in FIG. 9, the graduated electrode catalyst 502' of the anode mirrors the graduated electrode catalyst 502 of the cathode. In other words, the first catalyst layer 510' is adjacent the electrolyte membrane 104, the second catalyst layer 520' is adjacent the first catalyst layer 510' opposite the electrolyte membrane 104, and the third catalyst layer 530' is adjacent the second catalyst layer 520' opposite the first catalyst layer 510'.

With the catalyst electrode configuration shown in FIG. 9, the active catalyst particles most resistant to dissolution, i.e., the active catalyst particle having the largest size and the lowest surface area, is at the membrane/catalyst interfaces 126, 126' where the dissolution potential is greatest. The third catalyst layers 530, 530' having the highest surface area and greater activity are proximate the gas diffusion layers 108.

For any of the embodiments described herein, the thickness of each catalyst layer in the graduated electrode catalyst can be the same or different. The desired thickness for a layer having catalyst with larger active catalyst particles is less than the thickness for a layer with catalyst having smaller particle size. The total thickness of the graduated catalyst electrodes described herein can be between 5 and 50 micrometers depending on the desired performance.

Each of the embodiments disclosed herein can be used in a fuel cell and fuel cell stack such as the fuel cell 70 shown in FIG. 2 and the fuel cell stack 10 shown in FIG. 1. By using the graduated electrode catalysts as described herein, fuel cell performance can be maintained while fuel cell durability is improved.

For any of the embodiments disclosed herein, the electrode assembly having a graduated electrode catalyst can be prepared by forming the first catalyst layer by applying a first catalyst solution to a catalyst support substrate and drying the first catalyst layer, forming the second catalyst layer by applying a second catalyst solution onto the first catalyst layer and drying the second catalyst layer, and in embodiments with a third layer, forming the third catalyst layer by applying a third catalyst solution onto the second catalyst layer and drying the third catalyst layer. The catalyst support substrate can be the electrolyte membrane 104 or can be a gas diffusion layer 108.

It is appreciated that certain features of the electrode assemblies and fuel cells, which are, for clarity, described in the context of separate embodiments, may also be provided in combination in a single embodiment. Conversely, various features of the electrode assemblies and fuel cells, which are, for brevity, described in the context of a single embodiment, may also be provided separately or in any suitable sub-combination. All combinations of the embodiments are specifically embraced by the present invention and are disclosed herein just as if each and every combination was individually and explicitly disclosed, to the extent that such combinations embrace operable processes and/or devices/systems. In addition, all sub-combinations listed in the embodiments describing such variables are also specifically embraced by the present electrode assemblies and fuel cells and are disclosed herein just as if each and every such sub-combination was individually and explicitly disclosed herein.

As will be apparent to those of skill in the art upon reading this disclosure, each of the individual embodiments described and illustrated herein has discrete components and features which may be readily separated from or combined with the features of any of the other several embodiments without departing from the scope or spirit of the present sensors and methods.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An electrode assembly for a fuel cell comprising:
   a first catalyst layer directly adjacent an electrolyte membrane and comprising first active catalyst particles supported on first support particles having a first support size; and
   a second catalyst layer directly adjacent the first catalyst layer and a gas diffusion layer opposite the electrolyte membrane comprising second active catalyst particles supported on second support particles having a second support size,
   wherein the first support particles are a non-carbon support, the second support particles comprise carbon, and the first support size is greater than the second support size.

2. The electrode assembly of claim 1, wherein the first support particles and the second support particles are a non-carbon support consisting essentially of at least one of metal oxides, metal nitrides, and metal oxynitrides, and the first active catalyst particles have a first particle size and the second active catalyst particles have a second particle size.

3. The electrode assembly of claim 1, wherein the first catalyst layer is directly adjacent a cathode side of the electrolyte membrane.

4. An electrode assembly for a fuel cell comprising:
   a first catalyst layer directly adjacent an electrolyte membrane and comprising first active catalyst particles supported on first support particles having a first support size;
   a second catalyst layer adjacent the first catalyst layer opposite the electrolyte membrane comprising second active catalyst particles supported on second support particles having a second support size; and
   a third catalyst layer directly adjacent the second catalyst layer and a gas diffusion layer and comprising third active catalyst particles supported on third support particles having a third support size,
   wherein the first support size is larger than the second support size which is larger than the third support size and the first support particles are non-carbon support, the second support particles consist essentially of graphitized carbon and the third support particles consist essentially of carbon.

5. The electrode assembly of claim 4, wherein the first support particles, the second support particles and the third support particles are non-carbon support consisting essentially of at least one of metal oxides, metal nitrides, and metal oxynitrides.

6. The electrode assembly of claim 4, wherein the first catalyst layer is adjacent a cathode side of the electrolyte membrane.

7. A fuel cell comprising:
   a cathode electrode and an electrolyte membrane, the cathode electrode comprising:
   a first catalyst layer directly adjacent the electrolyte membrane and comprising first active catalyst particles having a first particle size supported on first support particles having a first support size; and
   a second catalyst layer directly adjacent the first catalyst layer and a gas diffusion layer opposite the electrolyte membrane comprising second active catalyst particles having a second particle size supported on second support particles having a second support size,
   wherein:
   the first support particles are a non-carbon support consisting essentially of at least one of metal oxides, metal nitrides, and metal oxynitrides,
   the second support particles comprise carbon, and
   the first support size is larger than the second support size.

8. The electrode assembly of claim 4, wherein the first support size is between about 50-100 nanometers, the second support size is between about 40-50 nanometers, and the third support size is between about 20-30 nanometers.

9. The electrode assembly of claim 4, wherein the first active catalyst particles have a first particle size, the second active catalyst particles have a second particle size, and the third active catalyst particles have a third particle size, the first particle size being larger than the second particle size which is larger than the third particle size.

* * * * *